United States Patent [19]

Hammond et al.

[11] Patent Number: 5,685,927

[45] Date of Patent: Nov. 11, 1997

[54] RUN-FLAT TIRE WITH WET HANDLING DESIGN

[75] Inventors: Philip Stuart Hammond, Mogadore; Thomas Reed Oare, Suffield; Gary Edwin Tubb, Copley; William Marcellus Buckler, Jr., North Canton; Robert Allen Losey, Kent, all of Ohio

[73] Assignee: The Goodyear Tire & Rubber Company, Akron, Ohio

[21] Appl. No.: 391,746

[22] Filed: Feb. 21, 1995

Related U.S. Application Data

[60] Continuation-in-part of Ser. No. 239,056, May 6, 1994, Pat. No. 5,639,320, which is a division of Ser. No. 954,209, Sep. 30, 1992, Pat. No. 5,368,082.

[51] Int. Cl.⁶ .................. B60C 3/00; B60C 3/04; B60C 101/00; B60C 17/06
[52] U.S. Cl. .................. 152/209 R; 152/209 WT; 152/454; 152/517; 152/531; 152/538; 152/540; 152/546
[58] Field of Search .................. 152/454, 209 WT, 152/209 R, 531, 196–198, 200, 205, 207, 517, 525–527, 538, 540, 546, 549, 555, DIG. 19, 545, 542–543

[56] References Cited

U.S. PATENT DOCUMENTS

| | | |
|---|---|---|
| 1,294,161 | 2/1919 | Pratt . |
| 1,437,013 | 11/1922 | Pratt . |
| 3,542,108 | 11/1970 | Rye et al. . |

(List continued on next page.)

FOREIGN PATENT DOCUMENTS

| | | |
|---|---|---|
| 486907 | 10/1976 | Australia . |
| 495698 | 3/1977 | Australia . |
| 518813 | 11/1981 | Australia . |
| 530898 | 4/1983 | Australia . |
| 1164324 | 3/1984 | Canada . |
| 0005399 | 11/1979 | European Pat. Off. . |
| 0371755 | 6/1990 | European Pat. Off. . |
| 0465786 | 1/1992 | European Pat. Off. . |
| 0475258 | 3/1992 | European Pat. Off. . |
| 0590482 | 4/1994 | European Pat. Off. . |
| 0613793 | 9/1994 | European Pat. Off. . |
| 0663305 | 7/1995 | European Pat. Off. . |
| 2702181 | 9/1994 | France . |
| 3626123 | 2/1988 | Germany . |
| 58139806 | 8/1983 | Japan .................. 152/209 WT |
| 6341208 | 2/1988 | Japan .................. 152/517 |
| 63141809 | 6/1988 | Japan .................. 152/517 |
| 3104710 | 5/1991 | Japan .................. 152/517 |
| 4221209 | 8/1992 | Japan . |
| 6286404 | 10/1994 | Japan .................. 152/209 WT |
| 6286405 | 10/1994 | Japan .................. 152/209 WT |
| 25863 | 5/1905 | United Kingdom . |
| 1056771 | 1/1967 | United Kingdom . |
| 1423401 | 2/1976 | United Kingdom . |
| 1522843 | 8/1978 | United Kingdom . |
| 2033316 | 5/1980 | United Kingdom . |
| 2138367 | 10/1984 | United Kingdom . |
| 9014239 | 11/1990 | WIPO .................. 152/209 R |
| 9420316 | 9/1994 | WIPO .................. 152/454 |

OTHER PUBLICATIONS

Mechanical Engineering, Jul., 1994—*Even flat, these tires keep working*, Steven Ashley, pp. 50–52.

Tire Business, Apr. 5, 1993—*Michelin previews prototype aquachannel tire*, Bruce Davis.

*The Plain Dealer* Aug. 6, 1992, "Tire Makers Unveil New 'Run-flat' Models," p. G-1.

*Primary Examiner*—Adrienne C. Johnstone
*Attorney, Agent, or Firm*—David L. King

[57] ABSTRACT

A run-flat radial ply pneumatic tire 10 has a carcass structure reinforced with pairs of elastomeric sidewall fillers 42,46,48 and at least three bead cores 26,26' and 37. At least one bead core 37 lies axially between the lateral edges of the tread 12 and extends radially inwardly of the tread 12 and reinforcing belts 36 and radially outwardly of the first and second bead cores 26,26' and a carcass reinforcing structure 30. In several embodiments improved wet traction tread designs are employed.

13 Claims, 10 Drawing Sheets

U.S. PATENT DOCUMENTS

| | | |
|---|---|---|
| 3,682,223 | 8/1972 | Simpson . |
| 3,707,177 | 12/1972 | Boileau . |
| 3,830,273 | 8/1974 | Boileau .............................. 152/209 WT |
| 3,861,442 | 1/1975 | Bertrand . |
| 3,911,987 | 10/1975 | Takusagawa et al. . |
| 3,935,892 | 2/1976 | Arimura et al. . |
| 3,954,131 | 5/1976 | Hoshino et al. . |
| 3,964,532 | 6/1976 | Harrington . |
| 3,983,919 | 10/1976 | Messerly . |
| 4,067,374 | 1/1978 | Alden et al. . |
| 4,111,249 | 9/1978 | Markow . |
| 4,142,567 | 3/1979 | Johannsen et al. . |
| 4,162,698 | 7/1979 | Merli et al. . |
| 4,193,437 | 3/1980 | Powell ................................ 152/517 |
| 4,202,393 | 5/1980 | Ikeda et al. . |
| 4,235,273 | 11/1980 | Edwards et al. .................... 152/517 X |
| 4,261,405 | 4/1981 | Yamauchi et al. . |
| 4,265,288 | 5/1981 | Kaneko et al. . |
| 4,287,924 | 9/1981 | Deck et al. . |
| 4,365,659 | 12/1982 | Yoshida et al. ..................... 152/517 X |
| 4,405,007 | 9/1983 | Welter . |
| 4,700,762 | 10/1987 | Landers ............................... 152/209 R |
| 4,917,164 | 4/1990 | Ushikubo et al. . |
| 4,998,575 | 3/1991 | Kanamaru . |
| 5,131,445 | 7/1992 | Tokieda et al. . |
| 5,145,536 | 9/1992 | Noma et al. . |
| 5,263,526 | 11/1993 | Oare et al. . |
| 5,295,526 | 3/1994 | Tokieda et al. . |
| 5,329,980 | 7/1994 | Swift et al. ......................... 152/209 R |
| 5,337,815 | 8/1994 | Graas .................................. 152/209 R |
| 5,360,043 | 11/1994 | Croyle et al. ................... 152/209 R X |
| 5,368,082 | 11/1994 | Oare et al. . |
| 5,421,390 | 6/1995 | Gerard et al. ............... 152/209 WT X |
| 5,427,166 | 6/1995 | Willard, Jr. ......................... 152/517 X |
| 5,511,599 | 4/1996 | Willard, Jr. ......................... 152/517 X |

RUN-FLAT TIRE WITH WET HANDLING DESIGN

This is a continuation-in-part of application Ser. No. 08/239,056, filed May 6, 1994, now U.S. Pat. No. 5,639,320, which is a divisional application of application Ser. No. 07/954,209 filed Sep. 30, 1992, now U.S. Pat. No. 5,368,082.

BACKGROUND OF THE INVENTION

This invention relates to a tire; more particularly to a pneumatic tire capable of being used in the uninflated condition. This improved tire further lends itself to several unique tread configurations which can provide excellent wet traction. The tires carcass structure can improve or at least equal ride performance of conventional tires without exhibiting the normal weight penalties associated with run-flat type tires.

Various tire constructions have been suggested for pneumatic run-flat tires, that is, tires capable of being used in the uninflated condition. One approach described in U.S. Pat. No. 4,111,249 entitled the "Banded Tire" was to provide a hoop or annular band directly under and approximately as wide as the tread. The hoop in combination with the rest of the tire structure could support the vehicle weight in the uninflated condition. This band tire actually tensioned the ply cords even in the uninflated condition.

Another approach taken has been to simply strengthen the sidewalls by increasing the cross-sectional thickness thereof. These tires when operated in the uninflated condition place the ply cords and the sidewall in compression. Due to the large amounts of rubber required to stiffen the sidewall members, heat build-up is a major factor in tire failure. This is especially true when the tire is operated for prolonged periods at high speeds in the uninflated condition. Pirelli discloses such a tire in European Pat. Pub. No. 0-475-258A1. A Goodyear patent having some of the same inventors of the present invention disclosed the first commercially accepted run-flat pneumatic radial ply tire, the Eagle GSC-EMT tire. The tire was accepted as an equipment option for the 1994 Corvette automobile. U.S. Pat. No. 5,368,082 teaches the employment of special sidewall inserts to improve stiffness. Approximately six additional pounds of weight per tire was required to support an 800 lb load in this uninflated tire. These run-flat tires had a very low aspect ratio. This earlier invention although superior to prior attempts still imposed a weight penalty per tire that could be offset by the elimination of a spare tire and the tire jack. This weight penalty was even more problematic when the engineers attempted to build higher aspect ratio tires for the large luxury touring sedans. The required supported weight for an uninflated luxury car tire approximates 1400 lbs load. These taller sidewalled tires having aspect ratios in the 60% to 65% range means that the working loads were several times that of the earlier 40% aspect ratio run-flat Corvette type tires. Such loads meant that the sidewalls and overall tire had to be stiffened to the point of compromising ride. Luxury vehicle owners simply will not sacrifice ride quality for run-flat capability. The engineering requirements have been to provide a run-flat tire with no loss in ride or performance. In the very stiff suspension performance type vehicle the ability to provide such a tire was comparatively easy when compared to luxury sedans with a softer ride characteristic.

An equally important design consideration in the development of a run-flat tire is insuring that the uninflated tire remains seated on the rim. Solutions have been developed employing bead restraining devices as well as special rims to accomplish this requirement such as Bridgestone Expedia S-01 Run-flat A/M Tire. Alternatively, the Eagle GSC-EMT tire employed a new bead configuration enabling the tire to function on standard rims without requiring additional bead restraining devices.

A third design consideration is tread pattern selection. Recently, tires exhibiting improved wet traction have been commercialized. These tires exhibit large circumferential grooves called aquachannels. The Aquatred disclosed in U.S. Pat. No. 5,176,766, the Aqua Contact tire in U.S. Pat. No. 4,687,037, the Eagle Aquatred in U.S. Pat. No. 5,337,815 and the Catamaran disclosed in European Pat. Application EPO 465-786A1 all have large aquachannels.

The predecessor development tire to the Catamaran was earlier disclosed in Aug. 20, 1974, in U.S. Pat. No. 3,830,273 entitled Dual Tire. This early tire suffered from poor handling and ride problems and therefore was never commercially accepted. The primary feature of this tire was the employment of a third bead centrally disposed between two tread portions reinforced by belts. The use of three or more beads was not in itself novel and had been employed in several very early patented tires. However, the use of a third bead coupled with a large channel was new. EPO application publication No. 0613793A1 describes an improved third bead structure designed specifically to improve the handling characteristics of the Catamaran type tire.

None of these new wet traction type tires were built to specifically have a run-flat capability. The inventors of this patent application in furthering the development of the run-flat tires have contemplated coupling that feature with wet traction type treads. Their development efforts have discovered a surprising complimentary benefit of being able to achieve an improved ride and wet traction with a three bead tire having run-flat capabilities. This improved ride was heretofore a feature not inherent in the run-flat design approach.

SUMMARY OF THE INVENTION

A run-flat radial ply pneumatic passenger tire 10 has a carcass structure reinforced with a pair of elastomeric sidewall fillers 42 and at least three bead cores 26,26' and 37. The tire 10 has a nominal rim diameter, an axis of rotation, an annular tread 12, a pair of lateral tread edges 14,16, the axial distance between the two lateral tread edges defining the tread width (TW), at least one pair of reinforcing belts 36 located radially inwardly of the tread 12, a pair of sidewalls 18,20, one sidewall extending radially inwardly from each lateral tread edge 14,16, a maximum section width (SW) and a tire carcass structure. The tire carcass structure has the at least three annular bead cores 26,26' and 37 located coaxially with respect to the axis of rotation, at least an inner and an outer ply 38,40, forming a carcass reinforcing structure 30, an innerliner 35, the pair of first fillers 42, and a pair of bead fillers 48.

The first and the second bead core 26,26' is located radially inwardly from each sidewall 18,20. The at least one additional bead core 37 is located under the tread 12 radially inwardly of each pair of reinforcing belts 36 and lies axially between the lateral tread edges 14,16 and radially outwardly of the first and second bead cores 26,26' and the carcass reinforcing structure 30. The carcass reinforcing structure 30 radially inward of the at least one pair of reinforcing belts 36 extends circumferentially about the tire from the first bead core 26 to the second bead core 26'. The carcass reinforcing structure 30 has the inner ply 38 and the outer ply 413, each ply 38,40 has a pair of turnup ends 32,34,32',34'. One turnup end of each ply is wrapped about one of the first and second bead cores 26,26' and extends radially outwardly. The tire's innerliner 35 is located radially inward of the inner ply 38.

The tire has the pair of bead fillers 48, one bead filler being located above each of the first and second bead cores 26,26' and between the outer ply 40 and the turnup ends 32,34,32',34' of the inner and outer plies 38,40. Each bead filler terminates at a radially outer end at a radial distance G above the nominal rim diameter. The pair of first fillers 42 are located between the inner ply 38 and the innerliner 35. One first filler 42 extends from a location radially inward of the radially outer and end of each of the bead fillers 48 radially outward to beneath the at least one pair of reinforcing belts 36.

In a preferred embodiment, the pneumatic tire has a pair of second fillers 46. The second fillers 46 are located between the inner and outer plies 38,40. One second filler 46 extends from a location radially inward of the radially outer end of each of the bead fillers 48 radially outwardly to beneath the at least one pair of reinforcing belts 36. The sidewalls each have a total cross-sectional f' filer thickness T as measured at the radial location of the maximum section width of the normally inflated tire, the f' filler thickness T being greater than 2% and less than 5% of the section height of the tire if the tire has a section height which is 12 cm (4.7 inches) or less than 10% of the section height of the tire if the tire has a section height which is greater than 12 cm (4.7 inches). Each sidewall has a cross-sectional thickness as measured at the radial location of the maximum section width of the normally inflated tire, the cross-sectional thickness of each sidewall being less than 10% of the section height of the tire.

The tire structures described above are particularly well adapted to employ a variety of tread configurations.

In one embodiment the tread 12 has one very deep aquachannel groove 90; in an alternative embodiment the tire 10 employs two such aquachannel grooves 90. Alternatively, the tire can have a tread with no wide aquachannel type grooves.

DEFINITIONS

Figure 1:
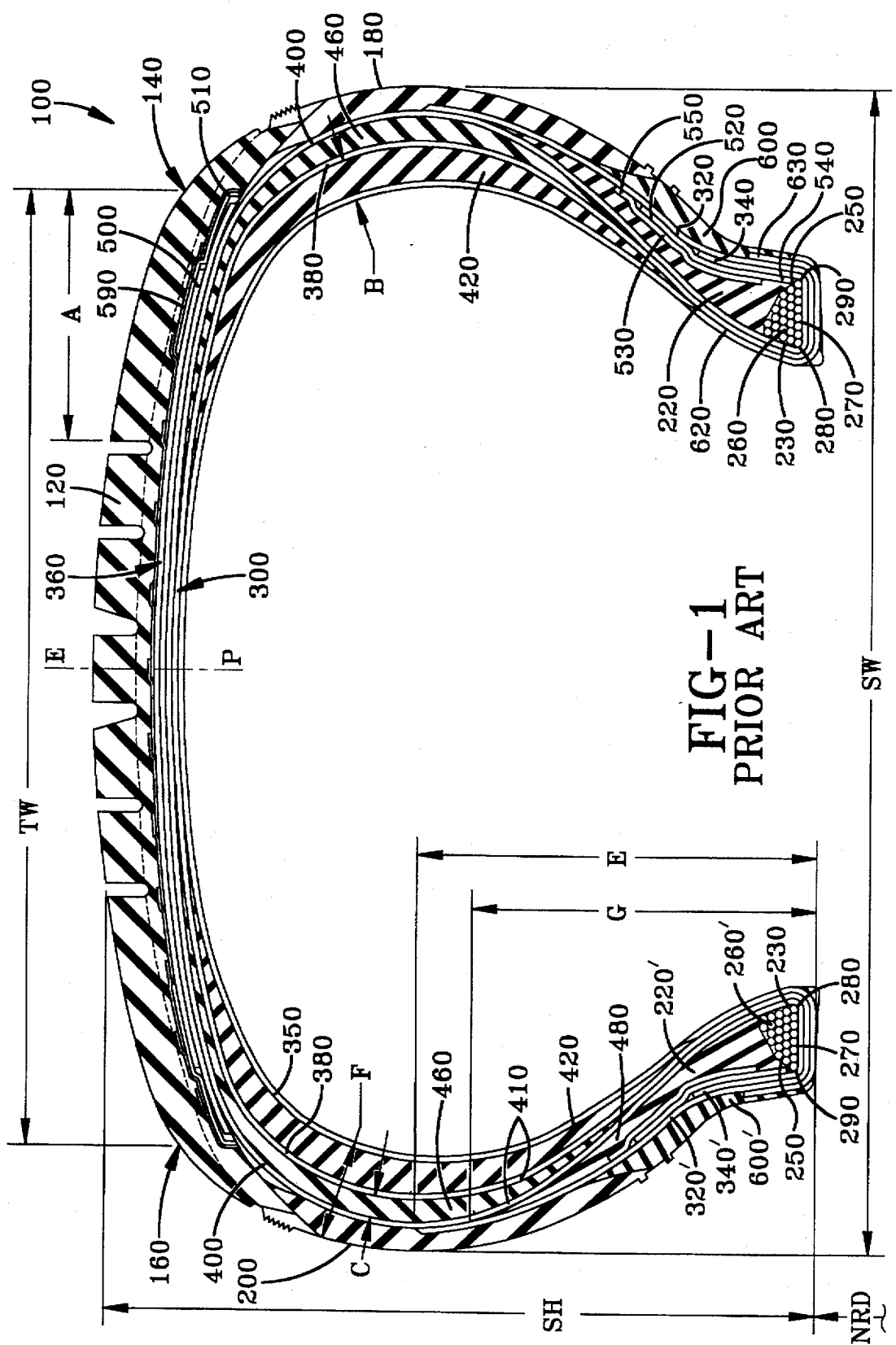
FIG. 1 is a cross-sectional view of a prior art tire made in accordance with U.S. Pat. No. 5,368,882.

"Aspect Ratio" means the ratio of its section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers, the bead or beads under the tread being encapsulated in tread rubber can be with or without other cord reinforced fabric elements.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, and sidewall rubber over the plies, but including the beads.

"Casing" means the carcass, belt structure, beads, sidewalls and all other components of the tire excepting the tread and undertread.

"Chafers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Ply" means a continuous layer of rubber-coated parallel cords.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

DETAILED DESCRIPTION OF THE PREFERRED EMBODIMENT

Referring to FIG. 1 there is illustrated a prior art tire 100 made in accordance with U.S. Pat. No. 5,368,082. The tire 100 is a passenger tire having a tread 120, a belt structure 360, a pair of sidewall portions 180,200, a pair of bead portions 220,220' and a carcass reinforcing structure 300. The carcass 300 includes a first ply 380 and second ply 400, a liner 350, a pair of beads 260,260' and a pair of bead fillers 480,480', a pair first insert fillers 420,420' and a pair of second insert fillers 460,460', the first insert filler 420,420' being located between the liner 350 and the first ply 380, the second insert fillers 460,460' being located between the first and second ply 380,400. This carcass structure 300 gave the tire 100 a limited run-flat capability.

The term run-flat as used in this patent means that the tire structure alone is sufficiently strong to support the vehicle load when the tire is operated in the uninflated condition, the sidewall and internal surfaces of the tire not collapsing or buckling onto themselves, without requiring any internal devices to prevent the tire from collapsing. Preferably, this means that under normal static load and a pressure of 26 psi, the percent deflection is a value X, the percent non-deflected bing $-1-X$. Under the same static load at a pressure of 0 psi, or in other words an uninflated condition, the percent non-deflected is about 75% of $1-X$. For example, a P275/40ZR17 tire having a non-loaded section height of 4.3 inches when normally loaded will deflect about ½ inch or 12%. At 0 psi the same tire deflects about 35%. Thus, the non-deflected value at 26 psi is 88% and 75% of 88% equals 66 percent for the non-deflected value.

The conventional pneumatic tire when operated without inflation collapses upon itself when supporting a vehicle load.

As can be seen from FIG. 1 the structural reinforcement in the sidewall area of the tire 100 substantially increased the thickness of the overall sidewall particularly from the maximum section width radially outward to the shoulder. This prior art patent taught that the overall sidewall thickness where it merges with the shoulder should be at least 100% preferably 125% of the overall sidewall thickness as measured at the maximum section width. This was believed to be necessary to sufficiently support the load in an uninflated state. The inserts for a typical P275/40ZR17 tire weighed approximately 6.0 lb. The first insert 420,420' had a maximum gauge thickness of 0.30 inches (7.6 mm)the second insert 460,460' had a maximum gauge thickness of 0.17 inches (4.3 mm).

The reference numerals as depicted in the drawings are the same as those referred to in the specification. For purposes of this application the various embodiments illustrated in FIGS. 2—6B each use the same reference numerals for similar components. The structures employ basically the same components with variations in location or quantity thereby giving rise to the alternative applications in which the inventive concept can be practiced.

Figure 2:
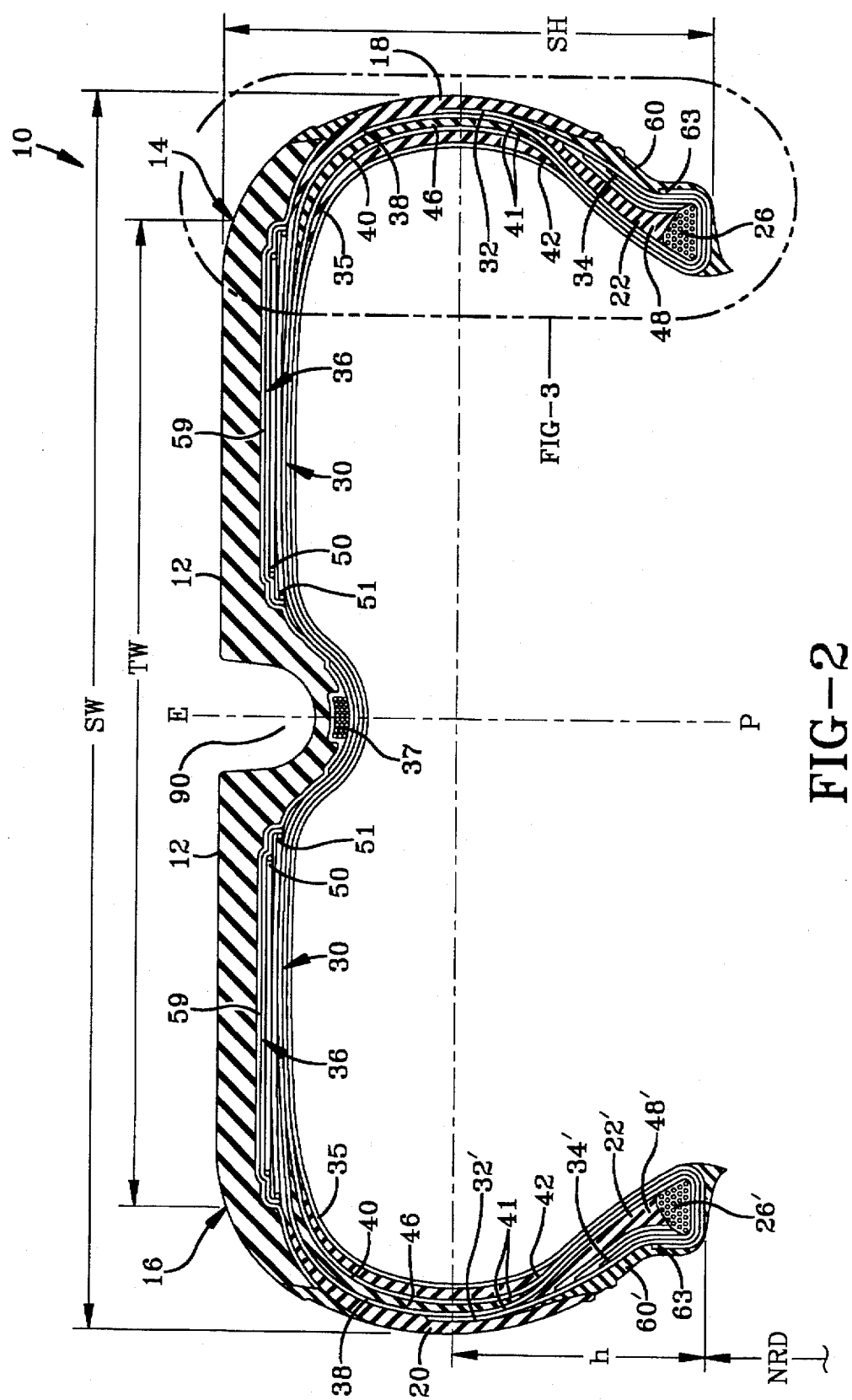
FIG. 2 is a cross-sectional view of a tire made in accordance with one embodiment of the present invention.

The tire 10 according to the present invention employs a substantially lighter weight approach. Tire 10 as illustrated in FIG. 2. is a passenger tire; the tire 10 is provided with a ground-engaging tread portion 12 which terminates in the shoulder portions at the lateral edges 14,16 of the tread 12 respectively. Sidewall portion 18,20 extends from tread lateral edges 14,16 respectively and terminates in a pair of bead regions 22,22' each having an annular inextensible bead core 26,26' respectively. The tire 10 is further provided with a carcass reinforcing structure 30 which extends from bead region 22 through sidewall portion 18, tread portion 12, sidewall portion 20 to bead region 22'. The turnup ends 32,34,32',34' of carcass reinforcing structure 30 are wrapped about bead cores 26,26' respectively. The tire 10 may include a conventional innerliner 35 forming the inner peripheral surface of the tire 10 if the tire is to be of the tubeless type. Placed circumferentially about the radially outer surface of carcass reinforcing structure 30 beneath tread portion 12 is two pairs of tread reinforcing belt structures 36,36' and an annular third bead core 37. In the particular embodiment illustrated, belt structures 36,36' each comprises two cut belt plies 50,51 and the cords of belt plies 50,51 are oriented at an angle of about 23 degrees with respect to the mid-circumferential centerplane of the tire.

The cords of belt ply 50 are disposed in an opposite direction to the mid-circumferential centerplane and from that of the cords of belt ply 51. However, the belt structures 36,36' may comprise any number of belt plies of any desired configuration and the cords may be disposed at any desired angle. Belt structures 36,36' provide lateral stiffness across the belt width so as to minimize lifting of the tread from the road surface during operation of the tire in the uninflated state. In the embodiments illustrated, this is accomplished by making the cords of belt plies 50, 51 of steel and preferably of a steel cable construction. Similarly the third annular bead 37 provides lateral and radial stiffness to the central portion of the tread.

The carcass reinforcing structure 30 comprises at least two reinforcing ply structures 38,40. In the particular embodiment illustrated, there is provided a radially inner first reinforcing ply structure 38 and a radially outer second reinforcing ply structure 40, each ply structure 38,40 comprising one layer of parallel cords 41. The cords 41 of reinforcing ply structure 38,40 are oriented at an angle of an least 75 degrees with respect to the mid-circumferential centerplane CP of the tire 10. In the particular embodiment illustrated, the cords 41 are oriented at an angle of about 90 degrees with respect to the mid-circumferential centerplane CP. The cords 41 may be made of any material normally used for cord reinforcement of rubber articles, for example, and not by way of limitation, rayon, nylon and polyester. Preferably, the cords are made of material having a high adhesion property with rubber and high heat resistance. In the particular embodiment illustrated, the cords 41 are made from rayon. The first and second reinforcing ply structure 38,40 each preferably comprise a single ply layer, however, any number of carcass plies may be used.

Figure 3:
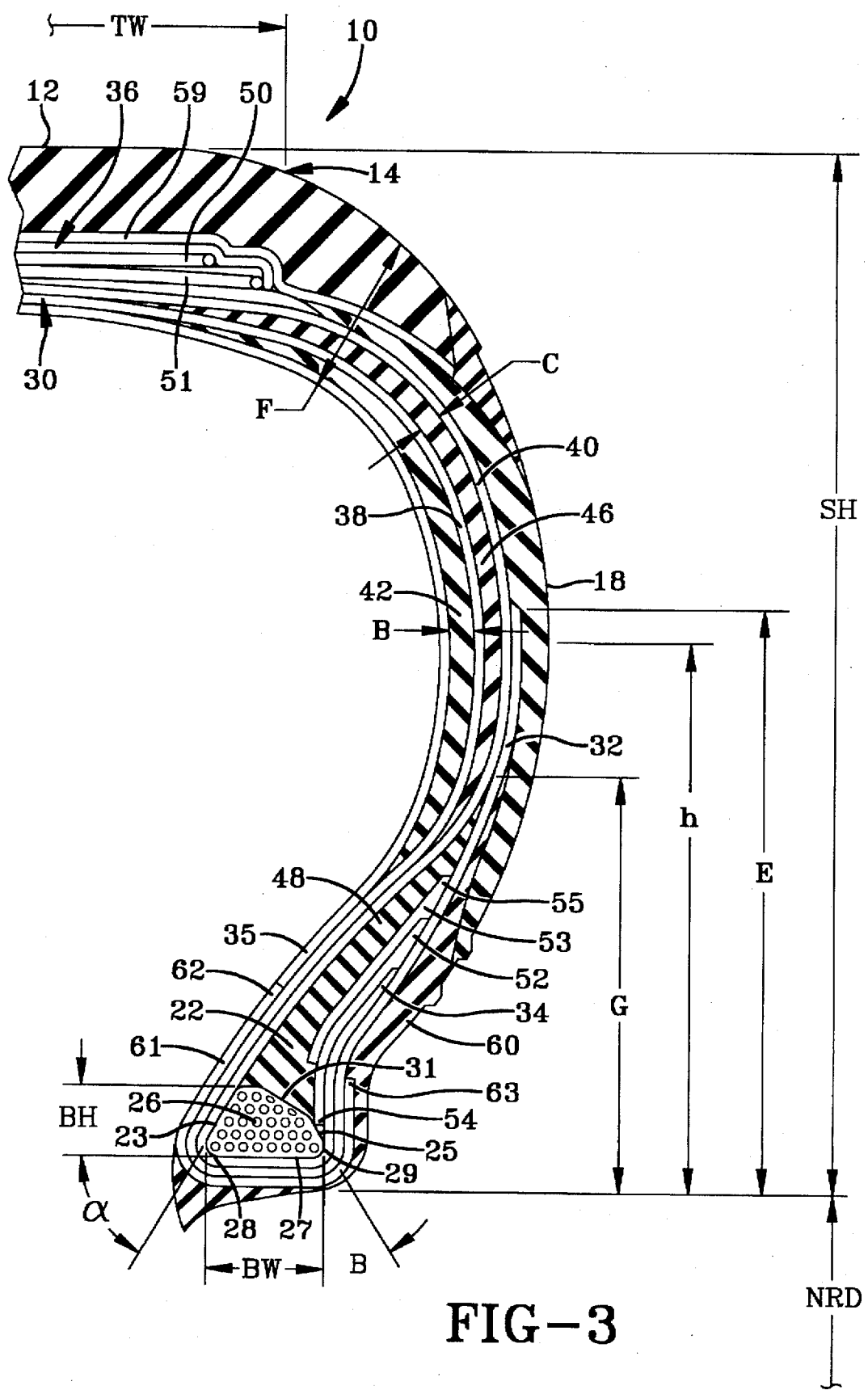
FIG. 3 is an enlarged fragmentary view of a tread shoulder, a sidewall, and a bead region of the tire of FIG. 2.

As further illustrated in FIG. 3, the first and second reinforcing ply structure 38,40 have turnup ends 32,34 and 32',34' respectively which wrap about the bead core 26 and 26' respectively. The turnup ends 34,34' of the second ply 40 are adjacent to the bead core 26,26' and terminates radially above the bead core 26,26'. The turnup ends 32,32' of the first ply 38 wrap about the second ply turnup ends 34,34' and the bead core 26,26'. The turnup ends 32,32' of the first ply 38 terminates radially a distance E above the nominal rim diameter of the tire in proximity to the radial location of the maximum section width of the tire 10. In the preferred embodiment, the turnup ends 32,32' are located within 20% of the section height of the tire from the radial location of the maximum section width, most preferably terminating at the radial location of the maximum section width. In such a case the turnup end 32,32' of the first ply 38 can be radially above or below the second ply turnup end 34,34'.

As further illustrated in FIG. 3, the bead regions 22,22' of the tire 10 each have an annular substantially inextensible first and second bead core 26,26' respectively. The bead core 26,26' has a flat base surface 27,27' defined by an imaginary surface tangent to the radially innermost surfaces of the bead wires. The flat base surface 27,27' has a pair of edges 28,29 and a width "BW" between the edges. The bead core 26,26' has an axially inner first surface 23 extending radially from edge 28 and an axially outer second surface 25 extending radially from edge 29. The first surface 23 and the flat base surface 27,27' form an acute included angle α. The second surface 25 and the flat base surface 27,27' form an acute included angle β. The angle α is greater than or equal to the angle β. In the preferred embodiment, α approximately equals β.

The bead core 26,26' may further include a radially outer surface 31 extending between the first and second surfaces 23,25 respectively. The radial outer surface 31 has a maximum height "BH." The height BH is less than the width of the base BW. The cross-section defined by surfaces 23,25, 27, and 31 preferably are in the form of an isosceles triangle. The upper portion of the triangular shape crosssection is generally not required because the strength of the core 26,26' as illustrated is sufficient to restrain the beads of an uninflated tire on the rim.

The bead core is preferably constructed of a single or monofilament steel wire continuously wrapped. In the preferred embodiment 0.050 inch diameter wire is wrapped in layers radially inner to radially outer of 8,7,6,4,2 wires, respectively.

The flat base surfaces of the first and second bead cores 26,26' are preferably inclined relative to the axis of rotation, and the bottom of the molded portion of the bead is similarly inclined, the preferred inclination being approximately about 10° relative to the axis of rotation more preferably about 10.5°. The inclination of the bead region assists sealing the tire and is about twice the inclination of the bead seat flange of a conventional rim and is believed to facilitate assembly and to assist retaining the beads seated to the rim.

Located within the bead region 22,22' and the radially inner portions of the sidewall portions 16,18 are high modulus elastomeric fillers 48 disposed between carcass reinforcing structure 30 and the turnup ends 32,34 and 32',34' respectively. The elastomeric fillers 48 extend from the radially outer portion of bead cores 26,26' respectively, up into the sidewall portion gradually decreasing in cross-sectional width. The elastomeric inserts 48 terminate at a radially outer end at a distance G from the nominal rim diameter NRD of at least 25 percent (25%) of the section height SH of the tire. In the particular embodiment illustrated, the elastomeric fillers 48 each extend radially outward from the nominal rim diameter NRD a distance of approximately forty percent (40%) of the maximum section height SH. For the purposes of this invention, the maximum section height SH of the tire shall be considered the radial distance measured from the nominal rim diameter NRD of the tire to the radially outermost part of the tread portion of the tire. Also, for the purposes of this invention, the nominal rim diameter shall be the diameter of the tire as designated by its size.

In a preferred embodiment of the invention the bead regions 22,22' further includes at least one cord reinforced member 52,53 located between the bead filler 48 and the second ply turnup end 32. The cord reinforced member or members 52,53 have a first end 54 and a second end 55. The first end 54 is axially and radially inward of the second end 55. The cord reinforced member or members 52,53 increase in radial distance from the axis of rotation of the tire 10 as a function of distance from its first end 54. In the illustrated FIG. 3, the cord reinforced member comprises two components 52,53 having a width of about 4 cm. The axially outer component 52 has a radially inner end 54 that is radially above with the outer edge 29 of the first and second bead cores 26,26'. The axially inner component 53 has a radially inner end that is radially outward of the outer edge 29 of the bead core 26,26' by about 1 cm. The axially inner and axially outer components 52,53, preferably have steel cord reinforcement. The second end 55 of the cord reinforced member is located radially outward of the second ply turnup end 32 and radially inward of the termination of the turnup end 34 of the first ply 38.

The cords of members 52,53 are preferably inclined forming an included angle relative to the radial direction in a range from 25° to 75°, preferably 30°. If two members are employed, the cord angles are preferably equal but oppositely disposed. The cord reinforcement member 52,53 improves the handling characteristics of a car having an uninflated tire of the present invention. The members 52,53 greatly reduce the tendency for the car to oversteer, a significant problem encountered in conventional tires that are driven while uninflated or underinflated.

A fabric reinforced member 61 may be added to the bead regions 22,22' of the tire 10. The fabric reinforced member has first and second ends 62,63. The member is wrapped about the first and the second plies 38,40 and the bead core 26,26'. Both the first and the second ends 62,63 extend radially above and outward of the bead core 26,26'.

Figure 4:
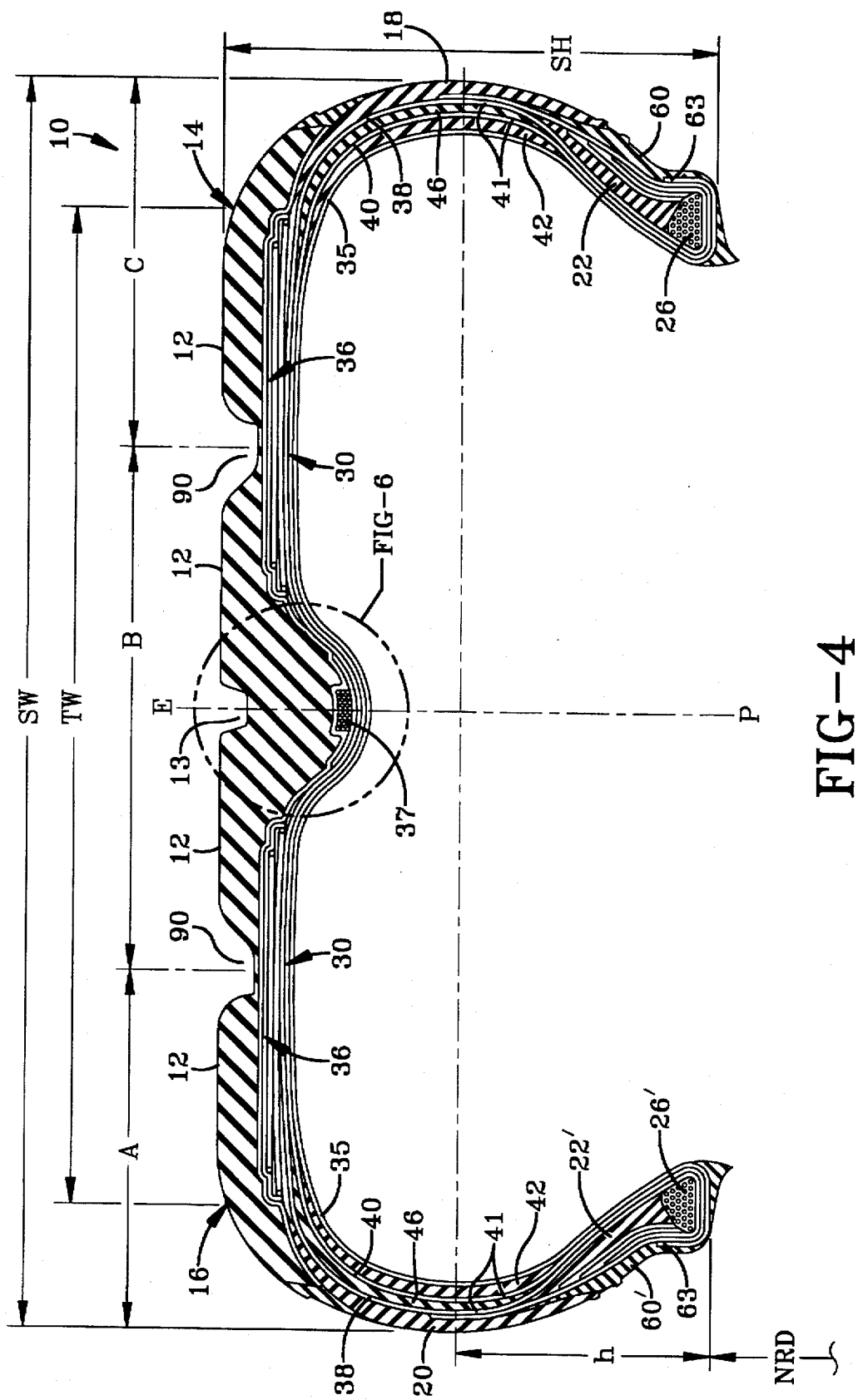
FIG. 4 is a cross-sectional view of a second embodiment of the tire made in accordance with the present invention.

The sidewall portions 18,20 are provided with elastomeric fillers 42. The first fillers 42 may be employed between the innerliner 35 and the first reinforcement ply 38. The first fillers 42 extend from each bead region 22,22' radially to beneath the reinforcing belt structures 36,36'. Alternatively, as illustrated in the preferred embodiment of the invention as shown in FIGS. 2, 4, and 5, the sidewall portions 18,20 may each include a first filler 42 and a second filler 46. The first fillers 42 are positioned as described above. The second fillers 46 are located between the first and the second plies 38,40 respectively. The second filler 46 extends from each bead region 22,22' radially outward to beneath the reinforcing belt structure 36.

The elastomeric first fillers 42 have a maximum thickness B at a location approximately radially aligned with the maximum section width of the tire 10, the thickness B being about three percent (3%) of the maximum section height SH. For example, in a P275/40R17 high performance tire the thickness B of the insert 42 equals 0.10 inch (2.5 mm)

For purposes of this invention, the maximum section width (SW) of the tire is measured parallel to the rotational axis of the tire from the axially outer surfaces of the tire, exclusive of indicia, adornment and the like. Also, for the purposes of this invention the tread width is the axial distance across the tire perpendicular to the equatorial plane (EP) of the tire as measured from the footprint of the tire inflated to maximum standard inflation pressure, at rated load and mounted on a wheel for which it was designed. In the particular embodiments illustrated in FIGS. 2–5B, the elastomeric first fillers 42 each have a maximum thickness B of approximately 3 percent (3%) of the maximum section height SH at a location (h) approximately radially aligned the maximum section width of the tire.

The elastomeric second fillers 46 have a maximum thickness C of at least one and one-half percent(1.5%) of the maximum section height of the tire 10 at the location radially above the maximum section width of the tire. In the preferred embodiment the elastomeric second fillers 46 each have a thickness C of approximately one and one-half percent (1.5%) of the maximum section height SH of the tire at a radial location of about 75% of the section height SH. For example, in a P275/40ZR17 size high performance tire the thickness C of the tire equals 0.08 inches (2 mm). At the location h, approximately radially aligned with the location of the maximum section width of the tire, the thickness of the second filler is 0.05 inches (1.3 mm).

The overall cross-sectional thickness of the combination of elastomeric fillers 42,46,and 48 preceding from the bead cores 26,26' to the radial location of the maximum section width (SW) is preferably of constant thickness. The overall sidewall and carcass thickness is about 0.45 inches (11.5 mm) at the maximum section width location E and increases to an overall thickness F, in the region where it merges into the shoulder near the lateral tread edges 14,16, F being about two hundred percent (200%) of the overall sidewall thickness as measured at the maximum section width SW of the tire. Preferably, the overall thickness F of the sidewall in the shoulder region of the tire is at least one hundred twenty five percent (125%) of the overall sidewall thickness at the maximum section width (SW), more preferable at least 150%. This ratio means that the sidewall is substantially thinner than the predecessor type run-flat tires.

Figure 6A:
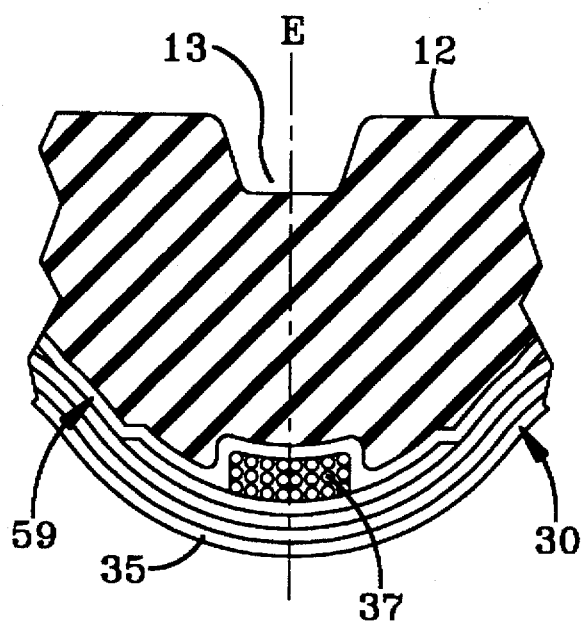
FIG. 6A is an enlarged view taken from FIG. 4 depicting the third bead location.
Figure 6B:
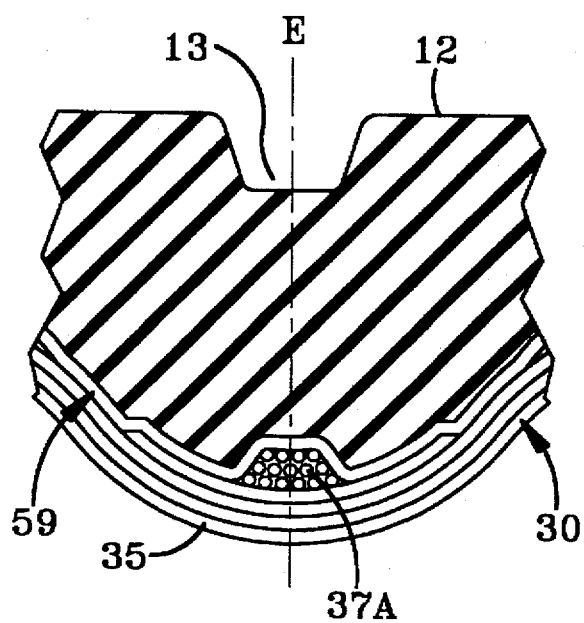
FIGS. 6B is an enlarged view of alternative third bead portion.

This thin sidewall construction is made possible by the employment of the third bead 37. The third bead 37 is located radially beneath the tread 12 and as shown in FIGS. 2 and 4 is interposed between the two reinforcing belts 36,36'. In the illustrated embodiment of FIG. 6A the bead core 37 is made of three layers each having eight separate high tensile steel wires. The wire is 0.050 inches (1.3 mm) in diameter. The bead 37 as shown has a cross-section exhibiting three layers of wire having eight wires of axial width. This tread bead core 37 alternatively can be made of any number of materials or cross-sectional shapes however the resultant bead core 37 must, when encapsulated in the rubber, exhibit a hoop strength sufficient to support several hundred pounds of dynamic load without collapsing. FIG. 6B shows an alternative bead construction 37A having a radially inner base of 6 wires and adjacent layers of 5 and 4 wires respectively formed from a single monofilament of 0.050 inch (1.3 mm) diameter wire has been tested yielding similarly hoop strength at about 80% of the weight of the 3× eight bead core.

The bead core 37 not only keeps the tread belt package unbuckled when the tire is operated under load and uninflated, it actually contributes to the load carrying capacity when the bead core 37 is constructed as taught above. The reinforcing belts 36,36' as illustrated in FIGS. 2 and 4 each have an axial width of about 3.5 inches (8.9 cm) and are axially spaced 2.5 inches (6.4 cm) apart. In a conventional tire the steel reinforced belts extend generally across the entire width of the tread. The use of two spaced narrow belt packages in combination with the third bead 37 results in about the same weight as the conventional tire's belt package. This redistribution of the belt package greatly changes the structural capability of the tire structure.

As in the conventional high performance type tires, the tires illustrated in FIGS. 2,4,4A,4B and 5A,5B may enhance the high speed performance of the tire by the application of a fabric overlay layer 59 disposed about the tread reinforcing belt structure 36. For example, two ply layers having nylon or aramid cords may be disposed above each reinforcing belt structures 36, the lateral ends extending past the lateral ends of the belt structures 36. Alternatively, a single layer of spirally wound aramid reinforced fabric can be employed as an overlay. The aramid material has a substantially higher modulus of elasticity than nylon and accordingly results in a stronger tire reinforcement than two layers of nylon. Applicants have found that a greater than 10% increase in high speed capability can be achieved in a tire with the single layer of aramid overlay. Generally the use of aramid material in passenger tire applications is avoided due in part to the fact that the material exhibits poor noise properties that resonate sounds through the relatively thin sidewalls of the passenger tire. Applicants' tire of the present invention employs reinforced sidewalls which noticeably dampen tire generated noises. The noise dampening sidewalls permit the use of an aramid overlay without experiencing unacceptable noise levels.

Applicants have found that by placing a reinforcing elastomeric fillers 42,46 between adjacent reinforcing ply structures in the manner previously described in combination with the third bead 37 placed beneath the tread 12, high levels of run flat performance can be obtained. During normal operation of the tire, the inflated medium provides the necessary support to carry the load. However, when the tire is operated in the uninflated state the sidewall portions and the bead core 37 must support the entire load. The tire construction of the present invention permits efficient use of the carcass structure in the uninflated condition while also providing the desired operating performance characteristics of the tire when operated in the inflated state. When the tire is operated in the uninflated state, deflection of the tire is only slightly greater than when operated in the inflated state. The internal surfaces of the tire do not come into contact with each other during operation in the uninflated state. Pneumatic passenger tires made in accordance with the present invention have been found to be capable of operation in the uninflated state for distances of about 100 miles (160 km) at speeds of up to 55 miles per hour (88 km/h) at 100% of the 26 psi normal rated load per Tire and Rim Association. After operating uninflated, the tire can be returned to normal operation in the inflated state. The drivable range in the uninflated condition can be in excess of 1000 miles (1600 km) depending on the load and environmental conditions.

The structural load supporting stiffness of the tire in the uninflated condition is primarily a function of the combination of hoop strength of the third bead 37 and the reinforced sidewall thickness. The sidewall thickness is measured exclusive of ornamentation such as lettering, numerals, decorative ribs and other such cosmetic features. In the prior art run-flat tires uninflated load support has been generally limited to the sidewall thickness. Each sidewall acts as a column supporting the tire load. Therefore, the vehicle load must be supported by the two sidewalls $^L$VEH=$^{2L}$sidewall. When uninflated, the tire according to the present invention has a third bead acting as a load carrying hoop. The vehicle load $^L$VEH is supported by the $^{2L}$sidewall +$^L$third bead. Therefore $^L$VEH−$^L$third bead=$^{2L}$sidewall.

The sidewalls ability to support the load is related to the column height and the thickness of the column. In the present invention the section height of the tire and the sidewall filler thickness have formed a ratio ST/SH. As the load increases the ST/SH ratio should also increase.

Ideally, the spring rate of the tire in the inflated condition should not change appreciably from that of a conventional non-run-flat pneumatic tire. When the run-flat tire is operated in the uninflated state the spring rate must be sufficient to prevent the tire from buckling or collapsing onto itself. The prior art tire of U.S. Pat. No. 4,111,249 with a resilient band, in order to function properly had to be designed to yield a tire spring rate approximately one-half the inflated tires spring rate. Otherwise a severe thumping problem could be evidenced. In the present invention, the third bead core 37, being very narrow and only capable of partial load support when operated in the uninflated condition, means that the overall spring rate should be in the range of 30% to 50% that of the inflated tire. This condition insures that for a given load the tire will only deflect about 2 to 3 times that of the inflated tire. This increase in deflection creates no significant handling problems at routine highway speeds. It is preferred, however, that a tire pressure indicator be installed in the vehicle passenger compartment so that the driver is made aware when a low pressure condition in one of his tires occurs.

The spring rate of a prior art P275/40ZR18 high performance run-flat tire, constructed as illustrated in FIG. 1, was approximately 2,000 lbs./in. In the uninflated condition the spring rate was 806 lbs./in. The fillers had a total thickness as measured at the radial location of the maximum section width of 0.35 inches (9 mm); the first filler being 0.23 inches (6 mm) and the second filler being 0.12 inches (3 mm). The prior art tire exhibited better than 200 miles of run-flat capability. A test tire of the size P275/40ZR17 was constructed using the same materials but with a third bead core 37 and a large aquachannel as illustrated in FIG. 2. The total thickness of the two pairs of fillers 42,46 was 0.15 inches (3.8 mm) per pair of fillers. The total weight of the fillers was 2.74 lbs. The tire also had a total sidewall thickness, as measured at the location of the maximum section width, of 0.40 inches (1 cm). It is believed preferable that the cross-sectional thickness of the sidewall should be less than 10% of the section height of the tire. The inflated spring rate was about 1,900 lbs./inch and the uninflated spring rate was 654 lbs./inch. The tire 10 exhibited in the range of 100 to a little over 150 miles of run-flat capability while utilizing only a little over half the filler weight and less than half to filler thickness. Although the nominal rim diameters were 18 inches and 17 inches respectively. The section heights were both 110 mm, the ability to support the loads not being affected by the difference in rim diameter.

The run-flat radial ply pneumatic tire 10 according to invention has an aspect ratio in the range of 0.3 to 0.65. It is believed that the ratio of filler thickness to section height should be 5% or less for tires having a section height of 4.7 inches (12 cm) or less and that for tires having a section height greater than 4.7 inches (12 cm) the ratio should be less than 10%. A tire was made in accordance to the present invention of the size P275/40ZR 17 or 18 having a section height of 4.33 inches (11 cm) and the ratio of filler thickness to section height of 3.5%. Similarly, a 225/60R16 tire was made according to the present invention having a section height of 5.3 inches (13.5 cm) and having a filler thickness of 0.32 inches (8 mm) or a ratio of 6%. This test tire exhibited only 60 miles of run-flat capability. As a test a similar tire was made without the third bead core but made in accordance to the prior art tire as shown in FIG. 1. This prior art tire having an identical section height of 5.3 inches required 0.9 inches (2.3 cm) of filler thickness to support the tire or a ratio of 17% to achieve an equivalent run-flat range of 60 miles. It is believed that having a third bead core 37 supporting at least part of the load of the vehicle when the tire is operated in the uninflated condition enables the tire engineer to choose between stiffening the hoop or stiffening the sidewalls, the combination being capable of making tires having somewhat taller section heights capable of run-flat capability.

Figure 7:
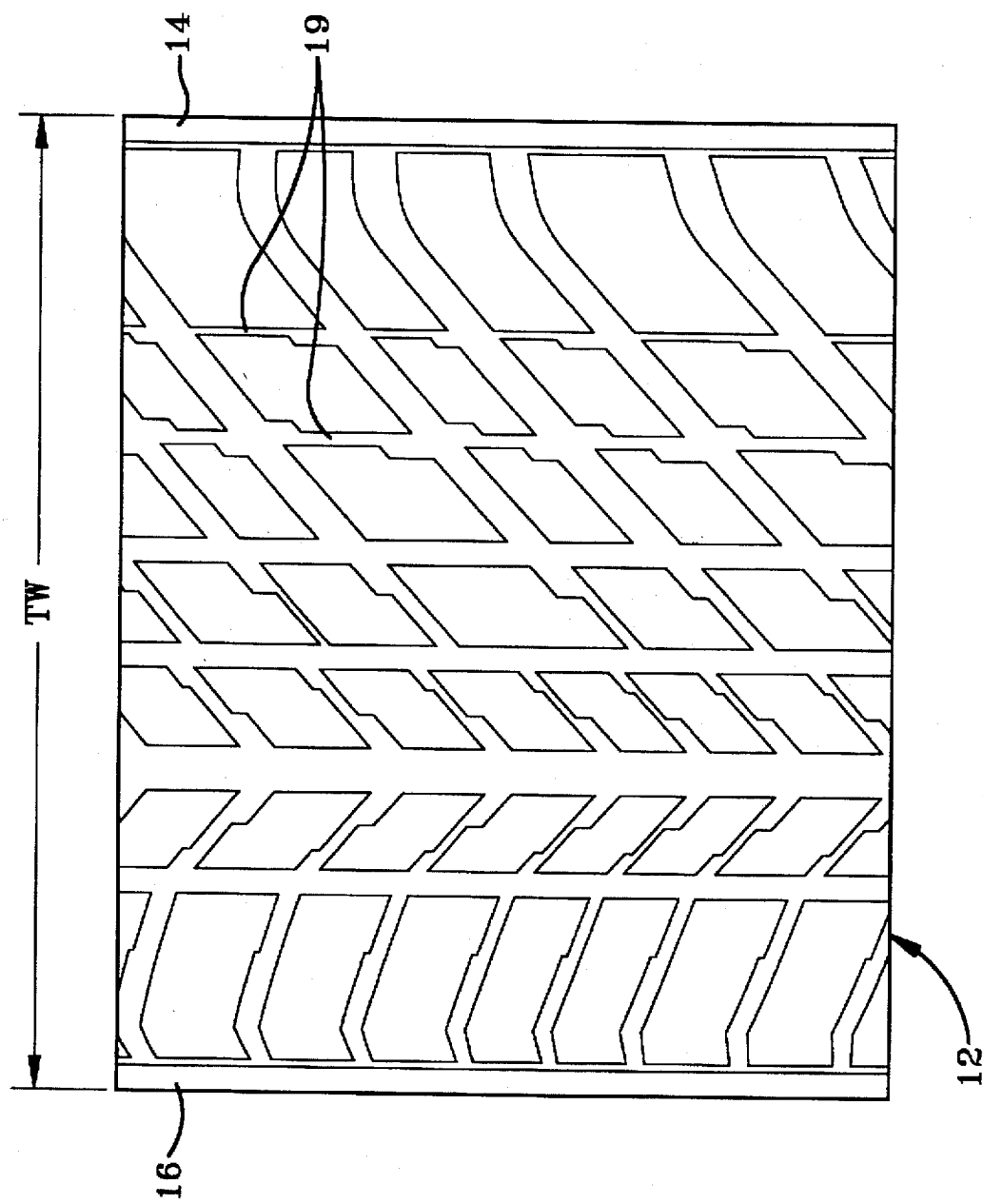
FIG. 7 is a partial fragmentry view of a tread employed in an embodiment of the invention.

Performance of the tire when operated in the underinflated or uninflated condition can be enhanced by selecting a tread design which provides high lateral stability at the lateral end portions of the tread. Preferably, the tread design is as taught in U.S. Pat. No. 5,360,043. With reference to FIG. 7, a tread 12 according to the present invention is illustrated. The tread 12 is annularly attached to a tire 10. The tread 12 as illustrated, is asymmetric and directional.

An asymmetric tread has a tread pattern that is not symmetrical about the centerplane or equatorial plane of the tire.

A directional tread is a tread that has a preferred direction of forward travel and must be positioned on a vehicle to insure that the tread pattern is aligned with the preferred direction of travel.

The use of directional tread patterns enables the tread to be optimized for forward travel. Conventional nondirectional tires are designed such that the tire can be mounted without a preferred direction of travel. This means that the tread must perform equally well regardless of how the tread is mounted to the tire. For this reason nondirectional tire treads are generally designed specifically to give uniform performance in either direction of travel. The nondirectional feature is an additional design constraint that forces design compromises that limit the performance capability of the tire.

The conventional passenger tire also has a tread pattern that is symmetrical relative to the centerplane of the tread. This enables the tire to freely be mounted independent of the direction of travel on either side of the vehicle. This symmetry of design assumes that the design loads and requirements must be equally met regardless of the tire orientation.

The use of an asymmetric tire with a directional tread means that there are left side and right side tires. This enables the tire designer to optimize the tread design to accommodate the vehicle requirements. The axial or lateral extent of the tread design can be varied to enhance performance.

The tread 12 illustrated in FIG. 7 is one example of an asymmetric-directional design according to the present invention.

The narrow grooves 19 in proximity of a lateral edge 14 are specifically designed in the preferred embodiment to permit the tread elements adjacent the groove 19 to flex into the groove void. The walls of the elements contact the walls of the laterally adjacent tread elements. This contact reinforces and increases the lateral stiffness of the tread 12 which in turn means the vehicle can handle higher speed turns. The wide and intermediate groove voids remain open thus insuring no significant loss of traction occurs under wet conditions.

More preferably the selection of the tread design also incorporated the use of at least one aquachannel groove 90. for the purposes of this invention, an aquachannel is a circumferential groove having a width equal to at least 10% of the tread width divided by the aspect ratio of the tire, preferably at least 15% more preferably at least 20%. These wide circumferentially continuous grooves 90 in combination with lateral grooves and sipes greatly enhance the wet traction characteristics of the tire.

As illustrated in FIG. 2, a very large channel 90 can be radially located directly above the third bead core 37. The channel 90 has an axial width greater than 10% of the tread width. In the illustrated embodiment of FIG. 2 the axial width of the groove 90, at the tread surface was 1.1 inch (3.0 cm) for the tread having a 10.4 inch (26 cm) tread width. The axial width at the groove base was 0.8 inch (2.0 cm). As can be readily observed the channel 90 will survive even when the tread is worn completely to the belt package. In a 40% aspect ratio tire the groove 90 has a width of 11.5% of the tread width and 28.75% of the tread width divided by the aspect ratio.

Alternatively, the tread my be configured a shown in FIG. 4. The tread has two circumferentially continuous aquachannel type grooves 90,90' each groove 90,90' being spaced between a lateral edge and the equatorial plane. The first groove 90 is located axially a distance A from the first lateral tread edge. The second groove 90' is located an axial distance B from the first groove 90. The second groove 90' is located a distance C from the second lateral edge. As shown the distance C approximately equals the distance A. Each groove therefore being about equally spaced from the third bead core.

Figure 4A:
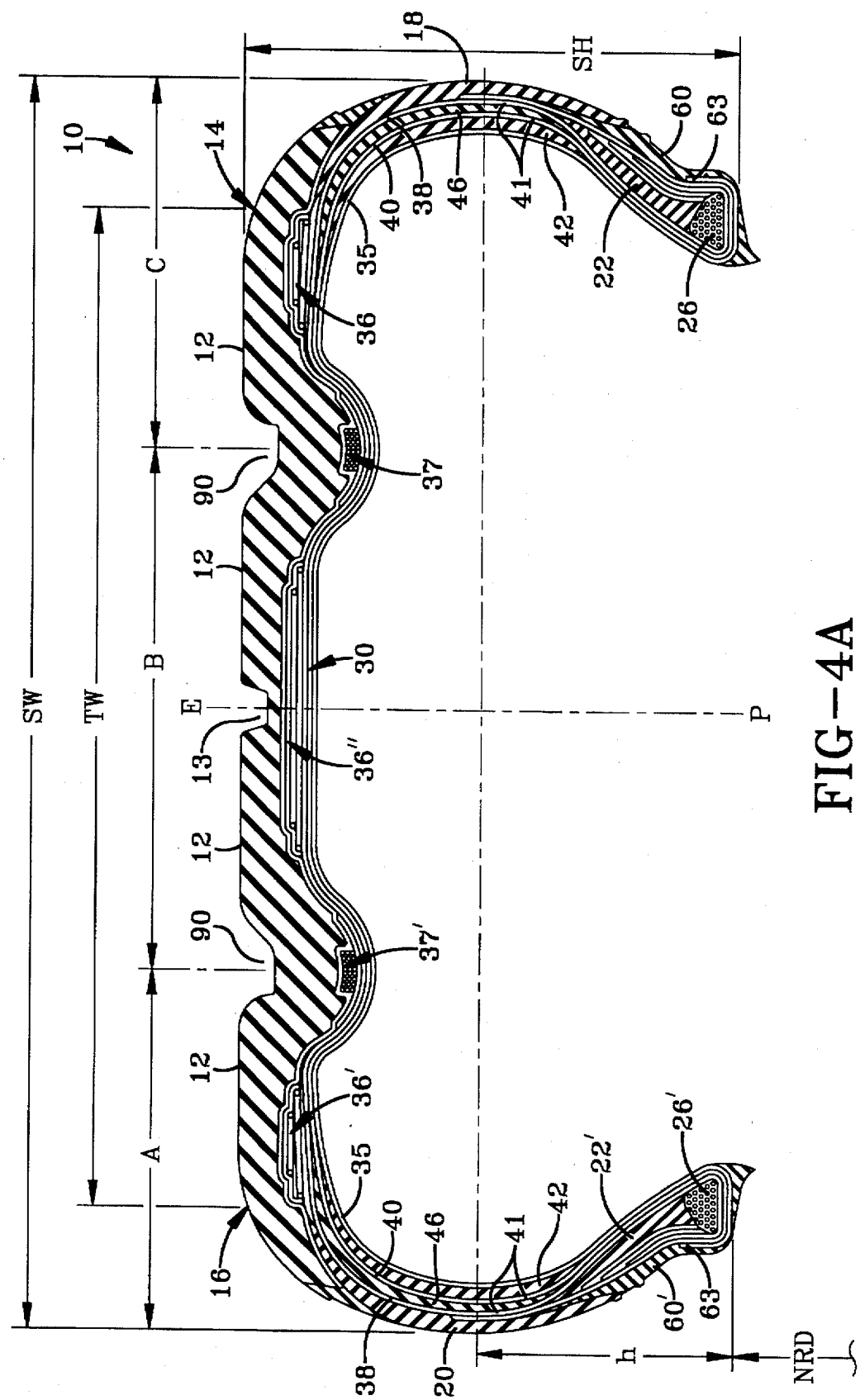
FIGS. 4A and 4B are cross-sectional views of alternative constructions of the second embodiment of FIG. 4.
Figure 4B:
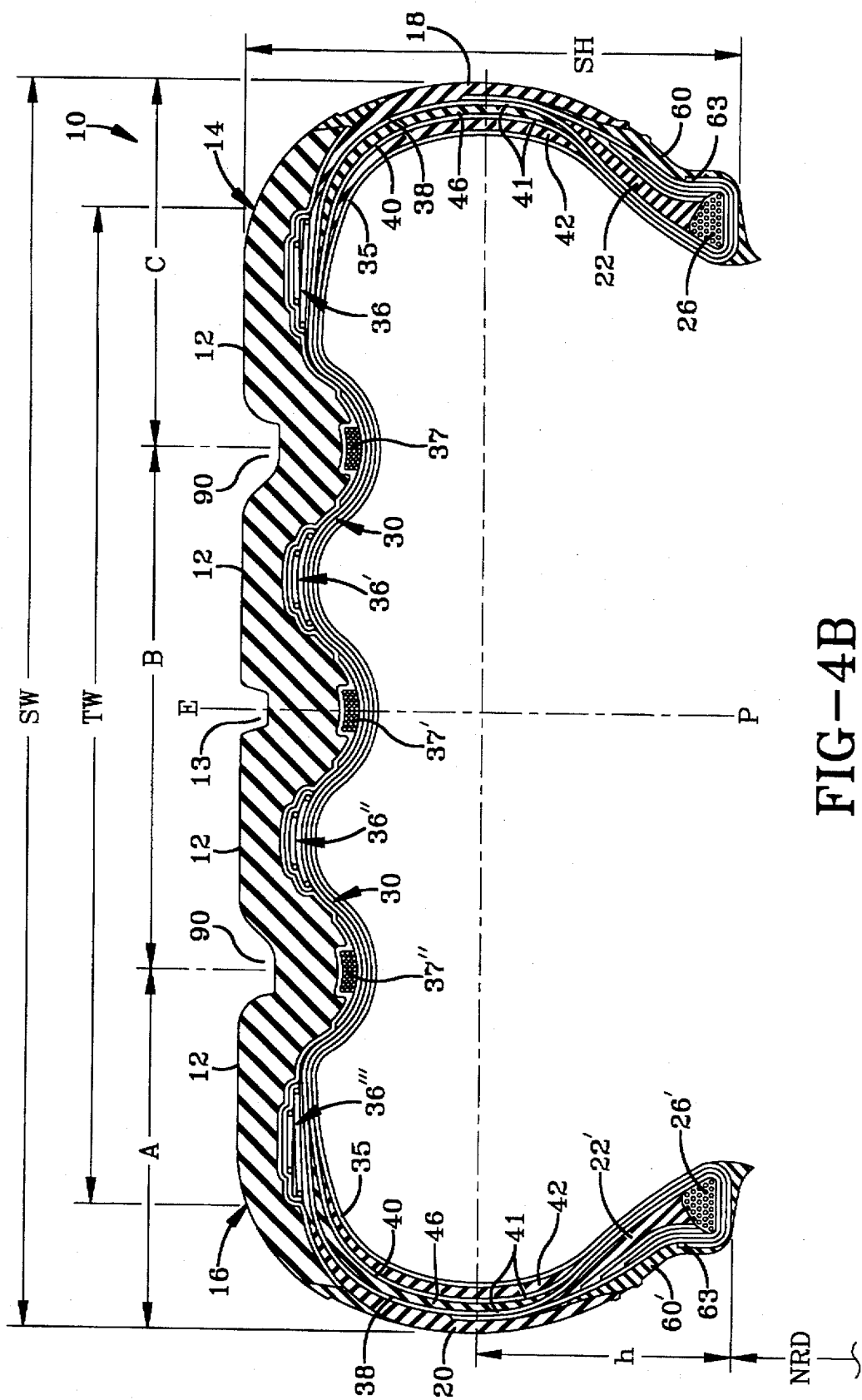

Alternatively the two channels 90,90' could each be placed radially above a bead core 37 and 37' as shown in FIG. 4A. In this embodiment the use of a third and fourth bead cores 37,37' requires an additional third belt package to be installed 36". This design is particularly well suited for very wide tires, however, the illustrated embodiment of FIG. 4 is considered to be less difficult to manufacture and accordingly less expensive. The tire of FIG. 4 is sufficient for almost all conventional tire applications. Alternatively the tire of FIG. 4A is considered to be very advantageous when the uninflated load is extremely high such as front wheel drive luxury vehicles with loads in excess of 1,500 lbs. It is feasible to employ a third, fourth, and fifth bead in very wide tires as shown in FIG. 4B.

Figure 5A:
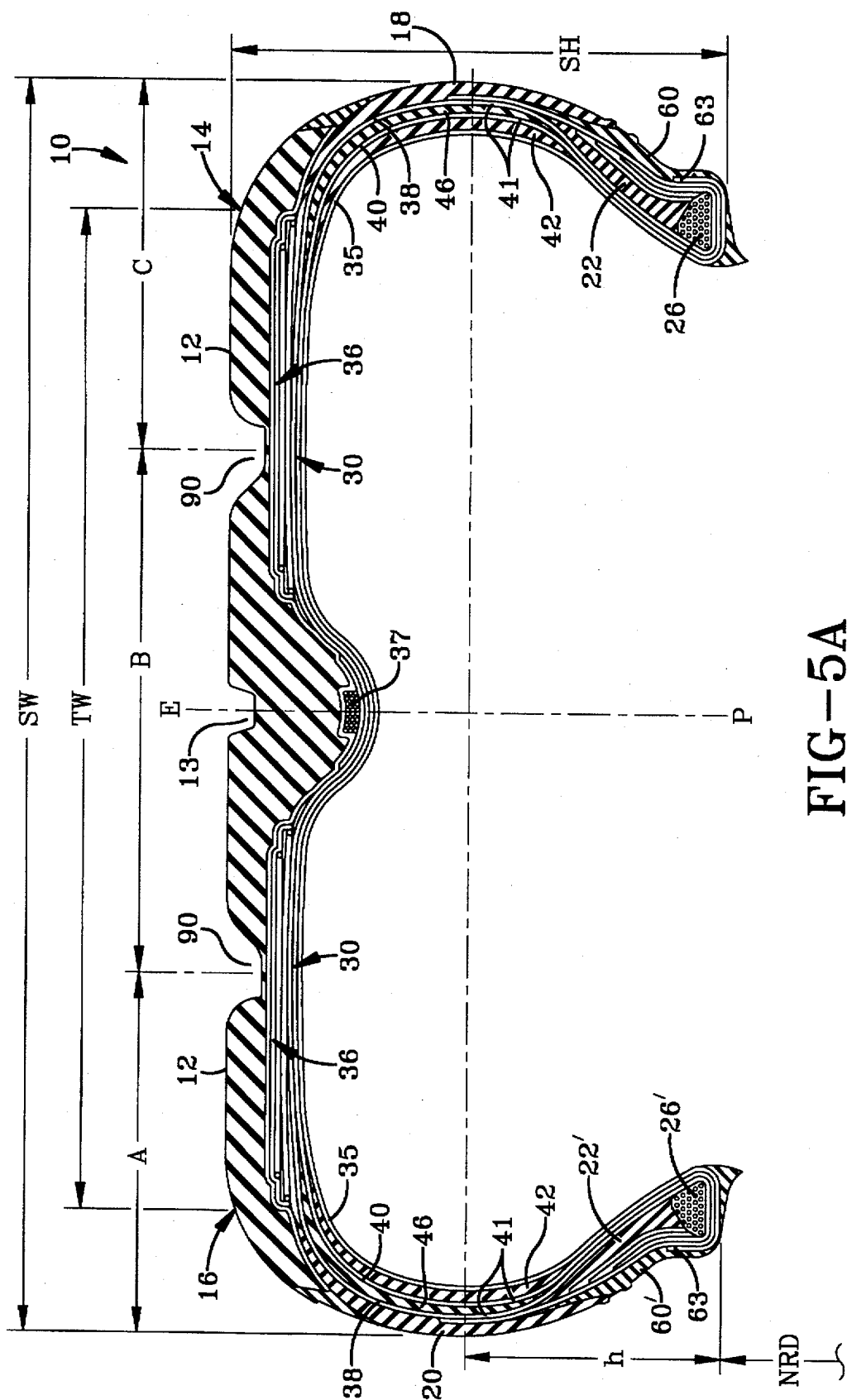
FIG. 5A is a cross-sectional view of a third embodiment of the tire made in accordance with the present invention.
Figure 5B:
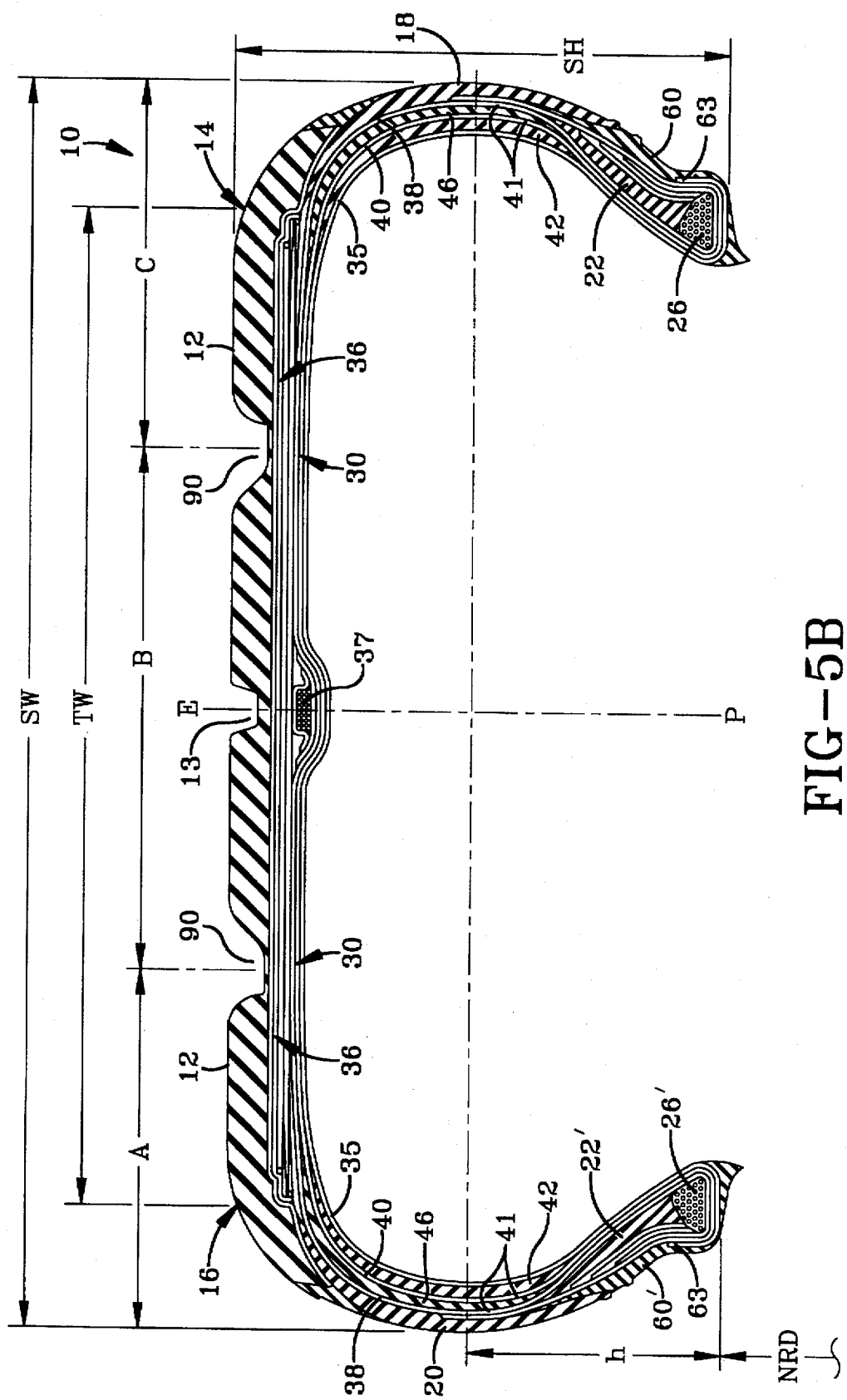
FIG. 5B is an alternative construction of the tire of FIG. 5A, FIG. 5B being shown in a crosssectional view.

In FIGS. 5A and 5B cross-sections of another alternative construction of the tire 10 is shown. The FIG. 5A depicts the third bead 37 being interposed between and located radially inward of two pairs of reinforcing belts 36,36'. FIG. 5B depicts another embodiment of tire 10 wherein the bead 37 is located radially inward of and adjacent to a single pair of reinforcing belts 36 extending axially between the lateral tread edges 14,16 a distance of at least 75% of the axial distance between the tread edges, preferably approximately equal to the entire tread width. The embodiment of FIG. 5A takes advantage of the weight savings afforded by the use of two pairs of belts 36,36'. The embodiment of FIG. 5B sacrifices this weight savings to some extent by employing a single pair of reinforcing belts 36. The tire, however, has a much simpler construction for manufacturing purposes and is further believed to enhance the lateral stiffness of the carcass structure.

Run-flat performance of the tire may be further enhanced by providing the ply coat of each layer of the reinforcing ply structures 38,40 with an elastomeric material having substantially the same physical properties as that of the elastomeric fillers 42,46. As is well known to those skilled in the tire art, the ply coat of a fabric layer is the layer of unvulcanized elastomeric material which is applied to fabric prior to its being cut to its desired shape and applied to the tire on the tire building drum. Preferably, the elastomeric material used as a ply coat for the ply layers is similar to the elastomeric material used in the reinforcing fillers 42,46.

In practice, the rubber compositions for the first fillers 42, second fillers 46 and the ply coats for one or more ply structures 38 and 40 utilized in this invention for the aforesaid pneumatic tire construction are preferably characterized by physical properties which enhance their utilization in the invention which are, collectively, believed to be a departure from properties of rubber compositions normally used in pneumatic tire sidewalls, particularly the combination of first and second fillers 42 and 46 with plies 38 and/or 40 having similar high stiffness/low hysteresis properties as hereinafter described.

Preferably, while the discussion herein refers to the ply coat(s) being for one or more of ply structures 38 and 40, in the practice of this invention, the plycoats referenced herein refers to plycoats for both plies 38 and 40 unless only one of such plies is used.

In particular, for the purposes of this invention, both of the aforesaid fillers 42 and 46 are characterized by having a high degree of stiffness yet by also having a relatively low hysteresis for such a degree of stiffness.

The stiffness of the rubber composition for fillers 42 and 46 is desirable for stiffness and dimensional stability of the tire sidewall.

The stiffness of the rubber composition for the ply coat for one or more of plies 38 and 40 is desirable for overall dimensional stability of the tire carcass, including its sidewalls, since it extends through both sidewalls and across the crown portion of the tire.

As a result, it is considered that the stiffness properties of the aforesaid rubber compositions of the first and second fillers 42 and 46 and of the ply structures 38 and/or 40 cooperate with the plies 38 and/or 40 to reinforce each other and to enhance the aforesaid dimensional stability of the tire sidewalls to a greater degree than if either of the aforesaid fillers or plycoats were alone provided with a high stiffness rubber composition.

However, it is to be appreciated that rubbers with a high degree of stiffness in pneumatic tires normally be expected to generate excessive internal heat during service conditions (operating as tires on a vehicle running under load and/or without internal inflation pressure), particularly when the rubber's stiffness is achieved by a rather conventional method of simply increasing its carbon black content. Such internal heat generation within the rubber composition typically results in a temperature increase of the stiff rubber and associated tire structures which can potentially be detrimental to the useful life of the tire.

The hysteresis of the rubber composition is a measure of its tendency to generate internal heat under service conditions. Relatively speaking, a rubber with a lower hysteresis property generates less internal heat under service conditions than an otherwise comparable rubber composition with a substantially higher hysteresis. Thus, in one aspect, a relatively low hysteresis is desired for the rubber composition for the fillers 42 and 46 and the plycoat(s) for one or more of the plies 38 and 40.

Hysteresis is a term for heat energy expended in a material (eg: cured rubber composition) by applied work and low hysteresis of a rubber composition is indicated by a relatively high rebound, a relatively low internal friction and relatively low loss modulus property values.

Accordingly, it is important that the rubber compositions for the fillers 42 and 46 and plycoats for one or more of plies 38 and 40 have the properties of both relatively high stiffness and low hysteresis.

The following selected desirable properties of the rubber compositions for the fillers 42 and 46 as well as for the plycoats for one or more of the plies 38 and 40 are summarized in the following Table 1.

TABLE 1

| Properties | Filler | Ply Coat |
|---|---|---|
| Hardness (Shore A)[2] | 60–70 | 60–70 |
| Modulus (100%) MPa[3] | 5–7 | 4–6 |
| Static Compression[1] | 0.1–0.15 | 0.15–0.2 |
| Heat Buildup (°C.)[1] | <30 | <30 |
| Cold Rebound (about 23° C.)[4] | 55–70 | 55–70 |
| E' at 100° C. (MPa) | 10–15 | 10–15 |
| E" at 100° C. (MPa) | 0.5–1.5 | 1–1.5 |

[1]Goodrich Flexometer Test-ASTM Test No. D623
[2]Shore Hardness Test-ASTM Test No. D2240
[3]Tension Modulus Test-ASTM Test No. D412
[4]Zwick Rebound Test-DIN 53512

The indicated hardness property is considered to be a moderate rubber hardness.

The indicated modulus property at 100% modulus is utilized instead of a 300% modulus because the cured rubber has a relatively low ultimate elongation at its breaking point. Such a cured rubber is considered very stiff.

The indicated static compression property, measured on a flexometer, is another indication of the relatively high stiffness of the cured rubber.

The indicated E' property is a coefficient of the storage or elastic moduli component of the viscoelastic property which is an indication of the material (eg: cured rubber composition) stiffness.

The indicated E" property is a coefficient of the loss or viscous moduli component of the viscoelastic property which is an indication of the hysteretic nature of the material (eg: cured rubber composition).

The utilization of both the E' and E" properties to characterize stiffness and hysteresis of rubber compositions is well known to those having skill in such characterizations of rubber.

The indicated heat buildup value is measured by a Goodrich flexometer (ASTMD623) test and is indicative of the internal heat generation of the material cured rubber composition).

The indicated cold rebound test property at about 23° C. (room temperature) is measured by Zwick Rebound Test (DIN 53512) test and is indicative of the material's (eg: cured rubber composition) resilience.

Thus, the properties illustrated in Table 1 indicate a cured rubber composition with a relatively high stiffness, moderate hardness and a relatively low hysteresis for a rubber with such a high stiffness.

The low hysteresis is demonstrated by the relatively low heat buildup, low E" and high rebound properties and is considered necessary for a rubber composition desired to have a relatively low internal heat buildup in service.

In the compounding of the various tire components, various rubbers may be used which are, preferably, relatively high unsaturation diene-based rubbers. Representative examples of such rubbers are, although they may not be so limited, are: styrene-butadiene rubber, natural rubber, cis 1,4 and 3,4-polyisoprene rubbers, cis 1,4 and vinyl 1,2-polybutadiene rubbers, acrylonitrile-butadiene rubber, styrene-isoprene-butadiene rubber and styrene-isoprene rubber.

Various of the preferred rubbers for the rubber compositions for the fillers 42 and 46 and for the plycoat(s) for one or more of the plies 38 and 40 are natural cis 1,4-polyisoprene rubber, isoprene/butadiene rubber, and cis 1,4-polybutadiene rubber.

Preferred combinations, or blends, of rubbers are natural cis 1,4-polyisoprene rubber and cis 1,4-polybutadiene rubber for the fillers and natural cis 1,4-polybutadiene rubber and isoprene/butadiene copolymer rubber for the plycoat(s).

In a preferred practice, based on 100 parts by weight rubber, (A) the fillers are comprised of about 60 to 100, preferably about 60 to 90, parts natural rubber and, correspondingly, up to about 40, preferably about 40 to about 10, parts of at least one of cis 1,4 polybutadiene rubber and isoprene/butadiene rubber preferably cis 1,4-polybutadiene rubber, where said isoprene/butadiene rubber, if used, is present in a maximum of 20 parts, and (B) the said plycoat(s) are comprised of up to 100, preferably about 80 to about 100 and more preferably about 80 to about 95, parts natural rubber and, correspondingly, up to about 100, preferably up to about 20 and more preferably about 20 to about 5, parts of at least one of isoprene/butadiene copolymer rubber and cis 1,4 polybutadiene rubber, preferably an isoprene/butadiene rubber; wherein the ratio of isoprene to butadiene in said isoprene/butadiene copolymer rubber is in a range of about 40/60 to about 60/40.

It is further contemplated, and is considered to be within the intent and scope of this invention that a small amount, such as about 5 to about 15 parts, of one or more organic solution polymerization prepared rubbers may be included with the aforesaid natural rubber, and cis 1,4 polybutadiene rubber and/or isoprene/butadiene rubber composition(s) for the said fillers and/or plycoat(s), of which the option and selection of such additional rubber(s) can be made by one having skill in the rubber compounding art without undue experimentation.

Thus, in such circumstance, the description of the filler and plycoat rubbers is set forth in a "comprising" manner with the intent that small amounts of such solution polymerization prepared elastomers can be added so long as the aforesaid physical property parameters of the cured rubber compositions are met. It is considered that such rubber compounding is within the skill of those with experience in the rubber compounding art without undue experimentation.

While not necessarily limited thereto, such other contemplated solution prepared rubbers are styrene/butadiene, and polymers of one or more of isoprene and butadiene such as 3,4-polyisoprene, styrene/isoprene/butadiene terpolymers and medium vinyl polybutadiene.

It should readily be understood by one having skill in the art that rubber compositions for components of the pneumatic tire, including the first and second fillers 42 and 46 as well as ply coat(s) for one or more or plies 38 and 40, can be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as rubber processing oils, resins including tackifying resins, silicas, and plasticizers, fillers, pigments, stearic acid or other materials such as tall oil resins, zinc oxide, waxes, antioxidants and antiozonants, peptizing agents and reinforcing materials such as, for example, carbon black. As known to those skilled in the art, depending on the intended use of the sulfur vulcanizable and sulfur vulcanized materials (rubbers), the certain additives mentioned above are selected and commonly used in conventional amounts.

Typical additions of carbon black comprise about 30 to about 100 parts by weight, of diene rubber (phr), although about 40 to about a maximum of about 70 phr of carbon black is desirable for the high stiffness rubbers desired for the indicated fillers and plycoat(s) used in this invention. Typical amounts of resins, if used, including tackifier resins and stiffness resins, if used, including unreactive phenol formaldehyde tackifying resins and, also stiffener resins of reactive phenol formaldehyde resins and resorcinol or resorcinol and hexamethylene tetramine may collectively comprise about 1 to 10 phr, with a minimum tackifier resin, if used, being 1 phr and a minimum stiffener resin, if used, being 3 phr. Such resins may sometimes be referred to as phenol formaldehyde type resins. Typical amounts of processing aids comprise about 4 to about 10.0 phr. Typical amounts of silica, if used, comprise about 5 to about 50, although 5 to about 15 phr is desirable and amounts of silica coupling agent, if used, comprise about 0.05 to about 0.25 parts per part of silica, by weight. Representative silicas may be, for example, hydrated amorphous silicas. A representative coupling agent may be, for example, a bifunctional sulfur containing organo silane such as, for example, bis-(3-triethoxy-silylpropyl) tetrasulfide, bis-(3-trimethoxy-silylpropyl) tetrasulfide and bis-(3-trimethoxy-silylpropyl) tetrasulfide grafted silica from DeGussa, AG. Typical amounts of antioxidants comprise 1 to about 5 phr. Representative antioxidants may be, for example, diphenyl-p-phenylenediamine and others, such as those disclosed in the Vanderbilt Rubber Handbook (1978), pages 344–346. Suitable antiozonant(s) and waxes, particularly microcrystalline waxes, may be of the type shown in the Vanderbilt Rubber Handbook (1978), pages 346–347. Typical amounts of antiozonants comprise 1 to about 5 phr. Typical amounts of stearic acid and/or tall oil fatty acid may comprise about 1 to about 3 phr. Typical amounts of zinc oxide comprise about 2 up to about 8 or 10 phr. Typical amounts of waxes comprise 1 to about 5 phr. Typical amounts of peptizers comprise 0.1 to about 1 phr. The presence and relative amounts of the above additives are not an aspect of the present invention which is primarily directed to the utilization of specified blends of resins in tire treads as sulfur vulcanizable compositions.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 8 phr with a range of from 3 to about 5 being preferred for the stiff rubbers desired for use in this invention.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 3 phr. In another embodiment, combinations of two or more accelerators in which a primary accelerator is generally used in the larger amount (0.5 to about 2 phr), and a secondary accelerator which is generally used in smaller amounts (0.05–0.50 phr) in order to activate and to improve the properties of the vulcanizate. Combinations of such accelerators have historically been known to produce a synergistic effect of the final properties of sulfur cured rubbers and are often somewhat better than those produced by use of either accelerator alone. In addition, delayed action accelerators may be used which are less affected by normal processing temperatures but produce satisfactory cures at ordinary vulcanization temperatures. Representative examples of accelerators include amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound, although a second sulfenamide accelerator may be used. In the practice of this invention, one and sometimes two, or more accelerators are preferred for the high stiffness rubbers.

The tire can be built, shaped, molded and cured by various methods which will be readily apparent to those having skill in the art.

EXAMPLE 1

The following rubber compositions are provided which are intended to exemplary of rubber compositions with properties which can fall within those exemplified in Table 1.

Rubber compositions are prepared and mixed by conventional rubber mixing processes and comprised of the materials shown in Table 2 which represent rubber compositions which may be contemplated for use as fillers 42 and 46 and ply coat(s) for one or more of plies 38 and 40. The indicated amounts of materials have been rounded for the illustration of this Example.

TABLE 2

| Material | (Parts by Weight) | |
|---|---|---|
| | Plycoat | Filler |
| Natural Rubber[1] | 90 | 80 |
| Isoprene/Butadiene Rubber[2] | 10 | 0 |
| Polybutadiene (cis 1,4-) Rubber[3] | 0 | 20 |
| Carbon black | 55 | 55 |
| Silica & Coupler | 6 | 6 |
| Zinc Oxide | 5 | 8 |
| Accelerators (Sulfenamide type) | 4 | 2 |
| Sulfur (insol w/20% oil) | 2 | 4 |

Conventional amounts of rubber processing oil and tall oil fatty acid, collectively about 5 parts with a minimum of 1 part each; antidegradants; tackifying and stiffening resins, primarily of the phenolformaldehyde type in an amount of about 6 phr; and silica and coupling agent therefore; are used with two accelerators for the plycoat sample and one accelerator for the filler rubber composition sample.

1. Cis 1,4-polyisoprene type
2. Copolymer with ratio of isoprene to butadiene of about 1:1
3. A high cis 1,4 polybutadiene rubber The rubber compositions are molded and cured at about 150° C. for about 20 minutes.

In the practice of this invention, it is considered important that the rubber compositions for both the fillers 42 and 46 and the ply coat(s) for one or more of plies 38 and 40 are relatively very stiff, moderately hard, and have a low hysteresis.

Further, it is normally desired that the rubber composition for fillers 42 and 46, relative to the rubber composition for plycoats for plies 38 and/or 40 is slightly stiffer, slightly harder and that both of the rubber compositions have a relatively low hysteresis.

It is important to appreciate that the indicated physical properties of the rubber compositions in Table 1 are for samples thereof and that the dimensions, including thickness, of the resulting tire components (fillers and plies) need be taken into account as factors contributing to the overall stiffness and dimensional stability of the tire sidewall and carcass.

It is considered important that the stiffness of the rubber composition for fillers 42 and 46 is somewhat greater than that of the aforesaid ply coat rubber composition because they are not a part of a fabric reinforced ply and further, because it is desired to somewhat maximize their stiffness property.

The hysteresis, or E", and heat buildup values for the rubber composition for the aforesaid fillers is desirably somewhat lower than that for the rubber composition for the aforesaid ply coat(s) because of the bulk of the fillers versus the thin dimensions of the fabric reinforced plies.

Chafing of the tire in the lower bead region radially outward of the carcass structure 30 adjacent the rim flange may be minimized, especially during use of the tire in the uninflated condition, by providing hard rubber chafer portion 60,60'.

While certain representative embodiments and details have been shown for the purpose of illustrating the invention, it will be apparent to those skilled in this art that various changes and modifications may be made therein without departing from the spirit or scope of the invention.

What is claimed is:

1. A run-flat radial ply pneumatic passenger tire having a nominal rim diameter, an axis of rotation, an annular tread, a pair of lateral tread edges, the axial distance between the two lateral tread edges defining the tread width, at least one pair of reinforcing belts located radially inwardly of the tread, a pair of sidewalls, one sidewall extending radially inwardly from each lateral tread edge, a maximum section width, a maximum section height, an aspect ratio and a tire carcass structure, the tire carcass structure comprising:

a) located coaxially with respect to the axis of rotation at least three annular bead cores, a first and a second bead core being located radially inwardly from each sidewall, and at least one additional bead core located under the tread radially inwardly of each pair of reinforcing belts and lying axially between the lateral tread edges and radially outwardly of the first and second bead core and a carcass reinforcing structure;

b) the carcass reinforcing structure radially inward of the reinforcing belts extending circumferentially about the tire from the first bead core to the second bead core, the carcass reinforcing structure having at least one ply, each ply having a pair of turnup ends, one turnup end of each ply being wrapped about one of the first and second bead cores and extending axially and radially outwardly; and c) an innerliner radially inward of the innermost ply;

d) a pair of first and second bead fillers, one bead filler located above each of the first and second bead cores and between the outermost ply and the turnup ends of the at least one ply, the bead filler terminating at a radially outer end at a radial distance G above the nominal rim diameter; and e) a pair of first fillers, the first fillers each being between the innermost ply and the innerliner, one first filler extending from a location radially inward of the radially outer end of each of the first and second bead fillers radially outwardly to beneath the reinforcing belts; and wherein the sidewalls each have a total cross-sectional filler thickness T as measured at the radial location of the maximum section width of the normally inflated tire, the filler thickness T being greater than 2% and less than 5% of the section height of the tire if the tire has a section height which is 12 cm (4.7 inches) or less and less than 10% of the section height of the tire if the tire has a section height which is greater than 12 cm (4.7 inches) and each sidewall has a cross-sectional thickness as measured at the radial location of the maximum section width of the normally inflated tire, the cross-sectional thickness of each sidewall being less than 10% of the section height of the tire.

2. The run-flat radial ply pneumatic passenger tire of claim 1, which further comprises:

f) two plies; and g) a pair of second fillers, the second fillers being between the plies, one second filler extending from a location radially inward of the radially outer end of each of the first and second bead fillers radially outwardly to beneath the reinforcing belts.

3. The run-flat radial ply pneumatic passenger tire of claim 1, wherein the tread has at least one circumferentially continuous wide groove, the groove having a width at least 10% of the tread width divided by the aspect ratio of the tire.

4. The run-flat radial ply pneumatic passenger tire of claim 3, wherein the tread has two circumferentially extending continuous wide grooves, the grooves having a width at least 10% of the tread width divided by the aspect ratio of the tire.

5. The ran-flat radial ply pneumatic passenger tire of claim 1 wherein said at least one additional bead core is at least two additional bead cores.

6. The run-flat radial ply pneumatic passenger tire of claim 1 wherein the at least one pair of reinforcing belts continuously extends an axial distance of at least 75% of the axial distance between the tread edges.

7. The run-flat radial ply pneumatic passenger tire of claim 1, the tire having an aspect ratio in the range of 0.3 to 0.65.

8. A run-flat radial ply pneumatic passenger tire having a nominal rim diameter, an axis of rotation, an annular tread, a pair of lateral tread edges, the axial distance between the two lateral edges defining the tread width, at least two pairs of reinforcing belts spaced axially apart located radially inwardly of the tread, a pair of sidewalls, one sidewall extending radially inwardly from each lateral tread edge, a maximum section width, a maximum section height, an aspect ratio and a tire carcass structure, the tire carcass structure comprising:

a) at least three annular bead cores, a first and a second bead core being located radially inwardly from each sidewall, and at least one additional bead core located under the tread radially inwardly and axially between each pair of reinforcing belts and lying axially between the lateral tread edges and radially outwardly of the first and second bead core and a carcass reinforcing structure;

b) the carcass reinforcing structure radially inward of the reinforcing belts extending circumferentially about the tire from the first bead core to the second bead core, the carcass reinforcing structure having an inner ply and an outer ply, each ply having a pair of turnup ends, one turnup end of each ply being wrapped about one of the first and second bead cores and extending axially and radially outwardly; and c) an innerliner radially inward of the inner ply;

d) a pair of first and second bead fillers, one bead filler being located above each of the first and second bead cores and between the outer ply and the turnup ends of the inner and outer plies, the bead filler terminating at a radially outer end at a radial distance G above the nominal rim diameter; and e) a pair of first fillers, the first fillers each being between the inner ply and the innerliner, one first filler extending from a location radially inward of the radially outer end of each of the first and second bead fillers radially outwardly to beneath the reinforcing belts; and wherein the sidewalls each have a total cross-sectional filler thickness T as measured at the radial location of the maximum section width of the normally inflated tire, the filler thickness T being greater than 2% and less than 5% of the section height of the tire if the tire has a section height which is 12 cm (4.7 inches) or less and less than 10% of the section height of the tire if the tire has a section height which is greater than 12 cm (4.7 inches) and each sidewall has a cross-sectional thickness as measured at the radial location of the maximum section width of the normally inflated tire, the cross-sectional thickness of each sidewall being less than 10% of the section height of the tire.

9. The run-flat radial ply pneumatic passenger tire of claim 8, which further comprises:

f) a pair of second fillers, the second fillers being located between the inner and outer plies, one second filler extending from a location radially inward of the radially outer end of each of the first and second bead fillers radially outwardly to beneath the reinforcing belts.

10. The run-flat radial ply pneumatic passenger tire of claim 8, wherein the tread has at least one circumferentially extending continuous wide groove, the groove having a width at least 10% of the tread width divided by the aspect ratio of the tire.

11. The run-flat radial ply pneumatic passenger tire of claim 10, wherein the tread has two circumferentially extending continuous wide grooves, the grooves having a width at least 10% of the tread width divided by the aspect ratio of the tire.

12. The run-flat radial ply pneumatic passenger tire of claim 8 wherein said at least one additional bead core is at least two additional bead cores.

13. The run-flat radial ply pneumatic passenger tire of claim 8, the tire having an aspect ratio in the range of 0.3 to 0.65.

* * * * *